United States Patent [19]

Birchall et al.

[11] 4,363,667

[45] Dec. 14, 1982

[54] CEMENTITIOUS COMPOSITION AND CEMENT PRODUCED THEREFROM

[75] Inventors: James D. Birchall, Mouldsworth; Kevin Kendall, Runcorn; Anthony J. Howard, Warrington, all of England

[73] Assignee: Imperial Chemical Industries Limited, London, England

[21] Appl. No.: 249,635

[22] Filed: Mar. 31, 1981

[30] Foreign Application Priority Data

Apr. 11, 1980 [GB] United Kingdom ............. 8012101

[51] Int. Cl.³ .................................................. C04B 7/35
[52] U.S. Cl. ................................... 106/90; 106/93
[58] Field of Search ............... 106/90, 97, 98, 99, 106/93

[56] References Cited

U.S. PATENT DOCUMENTS

| | | | |
|---|---|---|---|
| 3,131,075 | 4/1964 | Brooks | 106/98 |
| 3,489,588 | 1/1970 | Lindgren | 106/97 |
| 3,883,359 | 5/1975 | Harvey | 106/99 |
| 4,046,583 | 9/1977 | Collepardi | 106/90 |
| 4,111,711 | 9/1978 | Kiehl et al. | 106/97 |
| 4,118,242 | 10/1978 | Kjohl et al. | 106/98 |
| 4,200,153 | 4/1980 | Gallus | 106/97 |
| 4,263,191 | 4/1981 | Eck et al. | 106/90 |

FOREIGN PATENT DOCUMENTS

300853 11/1954 Switzerland ................. 106/93

*Primary Examiner*—James Poer
*Attorney, Agent, or Firm*—Cushman, Darby & Cushman

[57] ABSTRACT

A cementitious composition comprising
(a) at least one hydraulic cement,
(b) water,
(c) at least one polymeric water-soluble or water-dispersible additive which is capable of aiding in the processing of the composition, and
(d) at least one particulate material insoluble in the composition and having an ultimate particle size of less than 0.1 micron, and a cement product produced therefrom.

12 Claims, No Drawings

CEMENTITIOUS COMPOSITION AND CEMENT PRODUCED THEREFROM

This invention relates to a cementitious composition comprising a hydraulic cement and water and to a cement product produced by setting of the composition.

Hydraulic cements which are used commercially, for example Portland cement, calcium aluminate cements, Sorel cement and gypsum, are normally produced by a process which includes the step of milling the cement e.g. ball-milling. The milling step results in the production of a powdered cement which has a wide distribution of particle sizes, for example, a distribution of particle sizes over the range from submicron size to about 150 microns, although the cements generally contain a negligible proportion of particles in the submicron range.

Cement products may be produced from hydraulic cements by mixing the cement with water and causing or allowing the thus formed cementitious composition to set. However, in order that such a cementitious composition may be made in a form which is readily processable, for example in order that it may be made into the form of a plastic dough which may readily be shaped, e.g. by compression moulding or by extrusion, it is usual, or even necessary, to include in the cementitious composition an additive which aids in the processing of the composition. The use of such an additive also enables a processable cementitious composition to be produced which contains a proportion of water which is less than that which would be required in order to produce a processable composition in the absence of the additive. It is particularly desirable to use as little water as possible as the strength of the cement product produced from the cementitious composition generally increases with decrease in the amount of water in the composition. The additives which are used in the cementitious composition are water-soluble or at least water-dispersible and may be, for example, (a) a polymer having a lubricating action on the cement particles, or (b) an additive having a dispersing action on the cement particles, for example, a surfactant.

If desired, a mixture of different types of additive may be used.

The additives which aid the processing of the cementitious composition are generally used in a relatively small proportion, for example, in a proportion of up to 5% by weight of the hydraulic cement in the composition, although greater proportions by weight may be used if desired. With increase in the proportion of such additive which is used in the composition the strength of the cement product may also increase.

The use of such additives does however suffer from certain disadvantages. Thus, many of the additives which may be used are organic polymers which are expensive, the additives when present in the cement product are sensitive to environmental attack, and the additives, especially organic polymer additives, are not stable at elevated temperatures.

We have now found that a cementitious composition comprising a hydraulic cement, water, and an additive which aids in the processing of the composition may be modified by addition thereto of a particulate material of small particle size the effect of which is to reduce the amount of additive which it is necessary to use without at the same time causing a reduction in the processability of the cementitious composition or a reduction in the strength of the cement product produced therefrom. Furthermore, incorporation of the aforementioned particulate material in a cementitious composition comprising a given relatively low proportion of processing additive leads to the production of a cement product of higher strength than that of the product produced from a composition containing the same proportion of processing additive in the absence of the particulate material of small particle size, particularly a product of higher flexural strength.

The present invention provides a cementitious composition comprising (a) at least one hydraulic cement, (b) water, (c) at least one polymeric water-soluble or water-dispersible additive which is capable of aiding in the processing of the composition, and (d) at least one particulate material insoluble in the composition and having an ultimate particle size of less than 0.1 micron.

The invention also provides a cement product produced by setting of the aforementioned cementitious composition.

By hydraulic cement we mean any material which sets and hardens in the presence of water.

Examples of hydraulic cements include siliceous cements, e.g. Portland cement, aluminous cements, e.g. calcium aluminate cements, Sorel cement, and calcium sulphate cements, e.g. Plaster-of-Paris.

The composition may comprise two or more different hydraulic cements.

Many water-soluble or water-dispersible polymeric additives are known in the art which are capable of aiding in the processing of cementitious compositions. Such additives, which are preferably water-soluble, assist in the production of a plastic dough from a composition of a hydraulic cement and water. Indeed, in the absence of such an additive it may not even be possible in some cases to produce a cementitious composition in a form which is capable of being processed by conventional shaping techniques, especially where the composition contains a relatively small proportion of water. Thus, in the absence of such an additive it may not be possible to form the composition into a plastic dough which can readily be shaped.

Whether or not a particular polymer is sufficiently water-soluble or water-dispersible and is suitable for use as a processing aid in the cementitious composition of the invention may be determined by means of a simple test as follows. A composition comprising a mixture of 100 parts by weight of hydraulic cement, 14 parts by weight of water, and 5 part by weight of polymer should be capable of being formed into a plastic dough when compounded in conventional mixing equipment, for example when compounded in a Brabender Plastograph, when extruded, or when compounded on a twin roll mill. For example, if the polymer is sufficiently water-soluble or water-dispersible the composition will be sufficiently cohesive that it may be formed into a continuous, cohesive, plastic band on a twin roll mill. The sheet is preferably sufficiently cohesive that it may be removed from the rolls in lengths of at least 30 cm. If the polymer is not sufficiently water-soluble or water-dispersible a continuous, cohesive, plastic band will not be formed. Indeed the mixture may be friable.

Polymeric additives which are water-soluble or water-dispersible and which are capable of aiding the processing of cementitious compositions are well-known in the art. The additive may be an organic polymer or copolymer, and examples of such additives include (a) cellulose ethers, for example hydroxypropyl methyl cellulose, (b) amide-group containing polymers, for example a polymer or copolymer of acrylamide, (c) polyalkylene oxide derivatives which may be for example a polyalkylene oxide (alternatively described as polyalkylene glycol) for example polyalkylene glycols of molecular weight above 10,000, or polyalkoxy derivatives of alcohols, phenols, or the like, and (d) hydrolysed polymers or copolymers of vinyl acetate, particularly hydrolysed polyvinyl acetate.

Mixtures of two or more such additives, which may be of different types, may be used if desired.

The polymeric processing additive is used in an amount which is sufficient to produce a processable composition of hydraulic cement and water. In general, it will be necessary to use at least 0.5% of additive by weight of the hydraulic cement in the composition, and preferably at least 1% by weight. The use of greater amounts of processing additive assists the production of a composition which is readily processable. However, in general it will not be necessary to use more than 10% of such additive by weight of the hydraulic cement in the composition. Preferably the composition contains not more than 6% of processing additive by weight of the hydraulic cement in the composition.

The cementitious composition may contain in addition one or more non-polymeric additives which assist in the processing of the composition. Such non-polymeric additives are known in the art and may, for example, be additives which have a dispersing action on the cement particles in the composition. For example, the non-polymeric additive may be a sulphonated material known in the art for imparting plasticising properties, e.g a lignosulphonates or a sulphonated naphthalene salt.

The proportion of water in the cementitious composition should be sufficient to enable a processable dough-like composition to be produced. However, the proportion of water in the composition from which the cement product is produced may have an effect on the strength of the product, in general the greater the proportion of water the lower is the strength of the product, particularly the flexural strength. For this reason it is preferred that the composition comprises not more than 25% of water by weight of hydraulic cement in the composition, and preferably not more than 20% by weight of water.

The particulate material in the cementitious composition should have a particle size of less than 0.1 micron, by which we mean that the ultimate particle size, disregarding aggregation of particles, should be less than 0.1 micron. The ultimate particle size may be determined by microscopic examination of the particulate material. In general, for a cementitious composition containing given proportions of hydraulic cement, water, processing additive, and particulate material, the smaller is the particle size of the latter material the greater is the strength of the cement product produced from the cementitious composition. For this reason it is preferred that the particulate material has a particle size of less than 0.05 micron, and more preferably a particle size of less than 0.02 micron.

Mixtures of two or more different particulate materials may be used in the cementitious composition.

The particulate material should be insoluble in water, and insoluble in the cementitious composition, and it may be organic or inorganic. An example of a suitable organic particulate material is carbon black. Examples of inorganic particulate materials include alkaline earth metal carbonates, for example, calcium carbonate and magnesium carbonate, particularly precipitated calcium carbonate; inorganic oxides, for example, silica, titanium dioxide, and zirconium dioxide; and particulate siliceous materials, for example, aluminosilicate materials.

In order that the particulate material may have a reasonably substantial effect on the strength of the cement product produced from the cementitious composition of the invention it is preferred that the composition comprises at least 0.5% of particulate material by weight of the hydraulic cement in the composition. On the other hand, it will generally be unnecessary to use more than 10% of particulate material by weight of the hydraulic cement in the composition, although proportions up to 15% by weight may be used. Preferably the composition comprises not more than 6% of particulate material by weight of the hydraulic cement in the composition.

The cementitious composition and the cement product may be formed by techniques which are conventional in the cement art. Thus, the composition may be formed by mixing the hydraulic cement with the particulate material, and the polymeric processing additive, and finally with water, preferably under conditions of high shear in order to produce a thoroughly well mixed composition, and in a further embodiment of the invention there is provided a composition comprising (a) at least one hydraulic cement (b) at least one polymeric water-soluble or water-dispersible additive which is capable aiding in the processing of a water-containing composition, (c) at least one particulate material insoluble in water and having an ultimate particle size of less than 0.1 micron.

The processing additive may conveniently be used in the form of a viscous solution or gel of the additive in water, and the particulate material may conveniently be used in the form of a dispersion of the particulate material in water. Mixing under high shear may for example be effected on a twin-roll mill, the cementitious composition being sheared by repeatedly passing the composition through the nip between the rollers of the mill. A bladed high shear mixer may be used to effect initial mixing of the composition and the composition may subsequently be mixed and sheared on a twin-roll mill.

The composition may be shaped, for example, by extrusion or by compressing in a mould. Thus, the composition may be extruded through a suitably shaped orifice into the form of a rod or tube, or it may be extruded into the form of a sheet by passing the composition through the nip between the rolls of a twin-roll mill. However, the advantageous properties of the cement product are not dependent on the use of high pressure in the shaping of the composition, use of a pressure of 1 to 5 MPa generally being sufficient.

The setting of the cementitious composition may be achieved in conventional manner, for example, by maintaining the composition in a humid atmosphere, e.g at a relative humidity at or near 100% for a period of 0.5 to 30 days, or setting may be effected merely by allowing the composition to stand at ambient temperature and relative humidity. The time required to achieve setting is dependent at least in part on the temperature used, the higher the temperature the shorter the setting time required. Although setting may be effected at ambient temperature the time required may conveniently be reduced by using an elevated setting temperature in the range, for example, 40° C. to 120° C.

The cementitious composition may be set at elevated temperature and under an applied pressure e.g of less than 5 MPa and preferably less than 2 MPa, in order to reduce the overall porosity of the cement product. In this case the pressure is desirably released after the composition has set at least to the extent that it does not expand on release of the applied pressure.

Although the achievement of high flexural strength in the cement product is not dependent on the use of fibrous material in the cementitious composition from which the product is produced such materials may be used. Suitable fibrous materials, include asbestos, glass, steel, ceramic, polymer and vegetable fibrous materials. The amount of fibrous material used may be such as to result in a cement product containing, for example, 0.1% to 30% of fibrous material by weight of the fibre-containing cement product.

The cement products produced from the cementitious compositions of the invention generally have flexural strengths, as measured by the three-point blend test, of at least 40 MPa, and in many cases have flexural strengths considerably in excess of 40 MPa.

In order that the cement product may have a particularly high flexural strength it is preferred that not more than 2% of the total volume of the product comprises pores having a maximum dimension exceeding 100 microns, preferably 50 microns, and more preferably 15 microns, as described in European Patent Application No. 80301909.0 in the name of Imperial Chemical Industries Limited, now published as publication No. 0021682, which is incorporated herein by reference. Cement products which satisfy the aforementioned porosity criteria are of high strength, particularly high flexural strength, and in general the flexural strengths of the products are in excess of 50 MPa. In general, the lower is the proportion of the total volume of the cement product comprising pores having a maximum dimension exceeding 100 microns, preferably 50 microns, more preferably 15 microns, the greater is the strength of the cement product, and for this reason it is preferred that not more than 0.5% of the total volume of the cement product comprises pores of maximum dimension exceeding 15 microns.

It is also preferred, for additional improvements in flexural strength, that the total volume of pores in the cement product, expressed as a proportion of the apparent volume of the product, including the pores, does not exceed 20%, as described in the aforementioned publication. Porosities not exceeding 15%, and even porosities not exceeding 10% are more preferred.

The strength of the cement product, and in particular the flexural strength, in general improves with decrease in the proportion of pores in the product having a size in the range 2 to 15 microns, and it is preferred that the product contains less than 5%, more preferably less than 2%, of the apparent volume of the product of pores having a size in the range 2 to 15 microns, as described in the aforementioned publication.

The invention is illustrated by the following Examples in which all parts are expressed as parts by weight.

EXAMPLE 1

100 parts of ordinary Portland cement was dry mixed with 0.7 part of silica powder (Aerosil TT600) having a particle size of 0.04 micron by blending on a Hobart Mixer, and the resultant powder was mixed with 16.5 parts of an aqueous solution containing 3.5 parts of polyacrylamide (Cyanamer P250). The mixture was then compounded into a dough on a twin-roll mill by repeatedly passing the mixture through the nip between the rolls of the mill and the resultant sheet was then lightly pressed and set by allowing to stand for 14 days at a temperature of 20° C. in an atmosphere of 100% relative humidity.

The sheet had a flexural strength (as measured on a 3-point bend test) of 53±5 MPa.

By way of comparison the above procedure was repeated except that silica powder was omitted. In this case the sheet had a flexural strength of 35±1 MPa.

EXAMPLE 2

An aqueous gel was made by dissolving 3 parts of polyacrylamide (Cyanamer P250) in 12 parts of an alkali-stabilised aqueous silica sol which contained 3.6 parts of silica of particle size 0.02 micron (Nalfloc N 1030). The aqueous gel was then mixed with 100 parts of ordinary Portland cement (as used in Example 1) on a twin-roll mill, and the resultant sheet was pressed and set, following the procedure described in Example 1.

The sheet had a flexural strength of 52±2 MPa.

By way of comparison a sheet produced following the above procedure except that the alkali-stabilised silica sol was replaced by 12 parts of water had a flexural strength of 35±1 MPa.

EXAMPLE 3

An aqueous gel was made by dissolving 3 parts of hydroxypropyl methyl cellulose (Celacol 15000) in 12 parts of an alkali-stabilised aqueous silica sol which contained 3.6 parts of silica of particle size 0.02 micron (Nalfloc N 1030). The aqueous gel was then mixed with 75 parts of calcium aluminate cement (Secar 250) on a twin-roll mill, and the resultant shet was pressed and set, following the procedure described in Example 1.

The sheet had a flexural strength of 60.4±2 MPA.

The sheet contained less than 0.2% by volume of pores having a maximum dimension of greater than 15 microns, as determined by the method of quantitative microscopy described in the aforementioned European Patent Publication No. 0021682.

By way of comparison the above procedure was repeated except that the silica sol was omitted and replaced by 12 parts of water, and 5 parts of hydroxypropylmethyl cellulose were used.

The resultant sheet had a flexural strength of 62±3.5 MPa, thus demonstrating that the proportion of processing aid may be reduced and replaced by a particulate material of small particle size with no essential effect on the flexural strength of the cement product.

The sheet contained about 0.3% by volume of pores having a maximum dimension of greater than 15 microns.

By way of further comparison the above procedure of Example 3 was repeated except that the silica sol was replaced by 12 parts of water. The resultant sheet had a flexural strength of 33.5±3 MPa.

EXAMPLE 4

100 parts of ordinary Portland cement (as used in Example 1) was mixed on a twin-roll mill with 19.8 part of an aqueous gel containing 3.3 parts of polyacrylamide (Cyanamer P250). When the mixture had been formed into a continuous band on the rolls of the mill 5 parts of carbon black (Monarch 1100, Cabot) having a particle size of 0.014 micron was added to the sheet on the mill and blended into the sheet. The sheet was then lightly pressed and set following the procedure described in Example 1.

The resultant sheet had a flexural strength of 60.4±8 MPa.

By way of comparison a sheet produced following the above described procedure except that the carbon black was omitted had a flexural strength of 35.0±4 MPa.

We claim:

1. A cementitious composition comprising:
    (a) at least one hydraulic cement,
    (b) water in an amount of not more than 25% by weight of said hydraulic cement,
    (c) at least one polymeric water-soluble or water-dispersible additive which is capable of aiding in the processing of the composition in an amount of 1 to 10% by weight of the hydraulic cement in the composition, and
    (d) at least one particulate material insoluble in the composition and having an ultimate particle size of less than 0.1 micron, in an amount of 0.5 to 10% by weight of the hydraulic cement in the composition.

2. A cementitious composition as claimed in claim 1 in which the polymeric additive comprises hydroxypropyl methyl cellulose.

3. A cementitious composition as claimed in claim 1 in which the polymeric additive comprises polyacrylamide.

4. A cementitious composition as claimed in any one of claims 1 to 3 in which the particulate material has an ultimate particle size of less than 0.05 micron.

5. A cementitious composition as claimed in claim 4 which particulate material comprises carbon black.

6. A cementitious composition as claimed in claim 4 in which the particulate material comprises silica.

7. A cement product produced by setting of a cementitious composition comprising:
    (a) at least one hydraulic cement,
    (b) water in an amount of not more than 25% by weight of said hydraulic cement,
    (c) at least one polymeric water-soluble or water-dispersible additive which is capable of aiding in the processing of the composition in an amount of 1 to 10% by weight of the hydraulic cement in the composition, and
    (d) at least one particulate material insoluble in the composition and having an ultimate particle size of less than 0.1 micron, in an amount of 0.5 to 10% by weight of the hydraulic cement in the composition.

8. A cement product as claimed in claim 7 which product has a flexural strength of at least 40 MPa.

9. A cement product as claimed in claim 7 or claim 8 in which not more than 2% of the total volume of the product comprises pores having a maximum dimension exceeding 15 microns.

10. A composition comprising
    (a) at least one hydraulic cement,
    (b) at least one polymeric water-soluble or water-dispersible additive which is capable of aiding in the processing of a water-containing composition, and
    (c) at least one particulate material insoluble in water and having an ultimate particle size of less than 0.1 micron.

11. A cement product produced by setting of a cementitious composition as claimed in claim 1.

12. A cementitious product produced by a cementitious composition as claimed in claim 7.

* * * * *